E. FULLER.
SHOCK ABSORBER.
APPLICATION FILED MAR. 27, 1916. RENEWED JAN. 11, 1917.
1,217,296.  Patented Feb. 27, 1917.
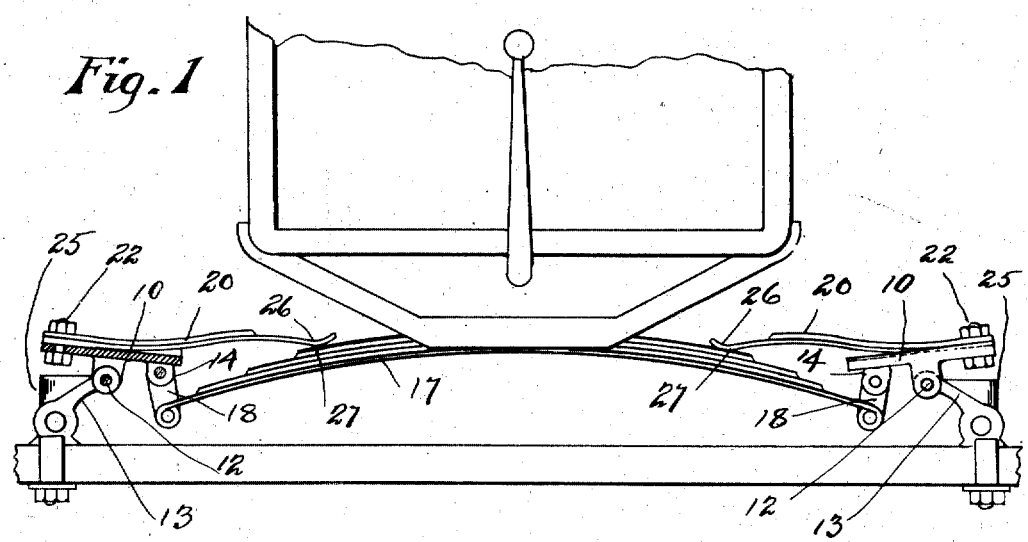
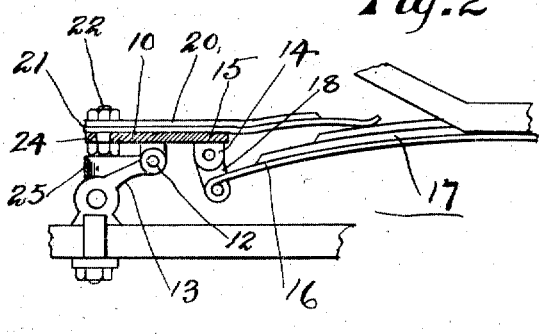
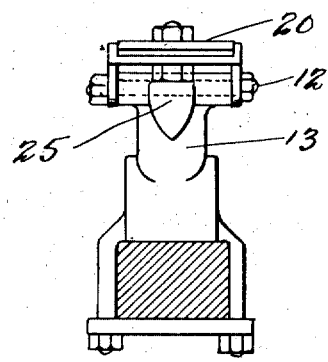
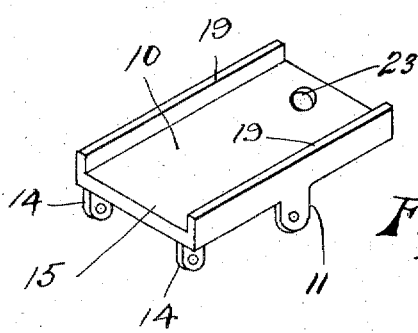
Witnesses
H. B. Barlow
O. F. Macready
Inventor
Eugene Fuller
By
Howard E. Barlow
Attorney

UNITED STATES PATENT OFFICE.

EUGENE FULLER, OF PROVIDENCE, RHODE ISLAND, ASSIGNOR OF ONE-HALF TO LEWIS A. PECKHAM, OF CRANSTON, RHODE ISLAND.

SHOCK-ABSORBER.

1,217,296. Specification of Letters Patent. Patented Feb. 27, 1917.

Application filed March 27, 1916, Serial No. 86,883. Renewed January 11, 1917. Serial No. 141,914.

*To all whom it may concern:*

Be it known that I, EUGENE FULLER, a citizen of the United States, and resident of the city of Providence, in the county of Providence and State of Rhode Island, have invented certain new and useful Improvements in Shock-Absorbers, of which the following is a specification.

The object of this invention is to provide an improvement in spring suspension for vehicles in which an auxiliary spring is used in conjunction with the ordinary vehicle spring to provide greater flexibility and also to prevent excessive reaction or rebound of the main spring.

With these and other objects in view, the invention consists of certain novel features of construction, as will be more fully described, and particularly pointed out in the appended claims.

In the accompanying drawings:

Figure 1— shows my improved shock absorbing device as applied to the ends of a transversely arranged vehicle spring.

Fig. 2— is a view illustrating the restraining action of the auxiliary spring upon the main spring in checking excessive rebound of the latter.

Fig. 3— is an end view of the vehicle shackle support or element showing the auxiliary spring supporting shoe or member as pivotally mounted thereon.

Fig. 4— is a detail in perspective showing the auxiliary spring supporting shoe or member.

My improved shock absorbing device herein shown and illustrated is more particularly adapted for use on a vehicle which is provided with a spring suspension of the transverse leaf spring type.

With reference to the drawings, 10 designates the shoe or member which is herein shown as being in the form of a plate but any desired form of shoe or member may be employed. The one shown is provided with a pair of downwardly extending side ears 11 substantially midway its length, by which it is pivoted at 12 to the shackle, bracket or vehicle element 13. This shoe is also shown as being provided with a pair of ears 14 projecting downwardly from its inner end 15 to which the outer end 16 of the main spring 17 is connected by the shackles 18.

The outer face of this shoe or member is formed with a central groove or recess and is provided with raised side edges 19 between which the auxiliary spring 20 is mounted, and which serve to prevent lateral movement of the same. This outer end 21 of this spring is rigidly and permanently attached to the outer end of this shoe or member by means of the bolt 22 which passes through the hole 23 therein.

One of the features of my improved device is that a stop 25 is provided for the purpose of limiting the backward rocking motion of this shoe member.

This stop is shown as being a portion of the bracket but I do not wish to be restricted to the construction of stop shown as any means may be employed for limiting the downward rocking motion of the outer end 24 of this member. As shown in Fig. 1 the auxiliary spring device is adapted to be applied to both ends of a transversely disposed main spring, but the same may be applied to any form of spring to which it may be adapted.

Another feature of this invention is that the device may be applied to such a vehicle by using the parts already in use for suspending the spring and that without drilling holes in parts of the vehicle.

The action and operation of the device is as follows: The weight of the vehicle body upon the main spring causes the shoe members 10 supporting either end thereof to normally tip inward slightly as illustrated in Fig. 1 exerting a tension upon the auxiliary springs 20, the outer ends of which are rigidly fixed to the outer ends of the shoes with their opposite ends 26 resting upon the back of the main spring at the points 27. When extra pressure is exerted on the main springs these auxiliary springs are caused to yield and so assist in yieldingly supporting the same. In traveling over rough roads as the main spring reacts and the pressure temporarily is lessened thereon, this shoe member 10 is permitted to rock backward under tension of the auxiliary spring until its outer end 24 brings up against the stop 25, at which time the inner end 26 of the auxiliary spring exerts its pressure upon the main spring and prevents excessive rebound of the same.

My improved shock absorbing device is extremely simple in construction, inexpensive to produce and effective in its operation.

It may be readily applied to any vehicle provided with a transverse spring suspension and that by using the original brackets without the necessity of drilling holes into any of the parts and by its use the riding qualities of the vehicle are greatly improved.

Having thus described one illustrative embodiment of my invention I desire it to be understood that although specific terms are employed they are used in a generic and descriptive sense and not for the purpose of limitation, the scope of the invention being set forth in the following claims.

I claim:

1. A compound spring for vehicles comprising a member pivoted on a vehicle element intermediate its ends, a main spring having its end supported by said member on the inner side of its pivoting point and an auxiliary leaf spring fixed to said member on the outer side of its pivoting point, and positioned to extend across said pivoting point with its opposite end supported on said main spring.

2. A compound spring for vehicles comprising a member pivoted on a vehicle element, a main spring having its end supported by said member on the inner side of its pivoting point, an auxiliary spring fixed to said member on the outer side of its pivoting point and positioned to extend across said pivoting point with its free end on the opposite side resting on said main spring, means in said member for preventing a relative lateral motion of said auxiliary spring therein, and an abutment for limiting the rocking motion of said member in one direction.

In testimony whereof I affix my signature.

EUGENE FULLER.